(12) United States Patent
Damola (10) Patent No.: US 10,349,305 B2
(45) Date of Patent: *Jul. 9, 2019

(54) METHOD FOR ENABLING TRAFFIC ACCELERATION IN A MOBILE TELECOMMUNICATION NETWORK

(71) Applicant: Telefonaktiebolaget LM Ericsson (publ), Stockholm (SE)

(72) Inventor: Ayodele Damola, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,474

(22) Filed: Aug. 8, 2016

(65) Prior Publication Data

US 2016/0353319 A1 Dec. 1, 2016

Related U.S. Application Data

(63) Continuation of application No. 13/991,950, filed as application No. PCT/SE2010/051345 on Dec. 7, 2010, now Pat. No. 9,426,690.

(51) Int. Cl.
*H04W 28/02* (2009.01)
*H04W 76/12* (2018.01)
*H04W 80/06* (2009.01)
*H04W 84/04* (2009.01)

(52) U.S. Cl.
CPC ....... *H04W 28/0273* (2013.01); *H04W 76/12* (2018.02); *H04W 80/06* (2013.01); *H04W 84/042* (2013.01)

(58) Field of Classification Search
CPC .................. H04W 28/0273; H04W 76/022

USPC ......................................................... 370/329
See application file for complete search history.

(56) References Cited

U.S. PATENT DOCUMENTS

| | | | |
|---|---|---|---|
| 6,108,703 A | | 8/2000 | Leighton et al. |
| 2003/0218996 A1* | | 11/2003 | Sumino .................. H04L 45/28 370/328 |
| 2005/0002412 A1 | | 1/2005 | Sagfors et al. |
| 2005/0111463 A1* | | 5/2005 | Nepomuceno Leung ................... H04W 92/18 370/395.52 |

(Continued)

FOREIGN PATENT DOCUMENTS

CN 101369875 A 2/2009
CN 101410819 A 4/2009

(Continued)

OTHER PUBLICATIONS

Xie, F. et al., "Semi-Split TCP: Maintaining End-to-End Semantics for Split TCP", Conference paper, 32nd Annual IEEE Conference on Local Computer Networks (LCN 2007), Oct. 15, 2007, pp. 1-9, IEEE.

(Continued)

*Primary Examiner* — Ronald B Abelson
(74) *Attorney, Agent, or Firm* — Coats & Bennett, PLLC (57) ABSTRACT

A radio network node of a mobile telecommunication network. The radio network node configured to determine a TCP session based on TCP parameters adapted for a radio link on which end user traffic is to be transported. The radio network node also configured to originate the TCP session which is used to transport the end user traffic.

16 Claims, 5 Drawing Sheets

(56) References Cited

U.S. PATENT DOCUMENTS

| | | | |
|---|---|---|---|
| 2005/0141455 A1* | 6/2005 | Kim | H04W 80/00 370/331 |
| 2006/0079284 A1* | 4/2006 | Lu | H04W 92/08 455/558 |
| 2006/0146872 A1 | 7/2006 | Hasegawa et al. | |
| 2007/0104221 A1* | 5/2007 | Venkatachalam | H04L 29/12839 370/468 |
| 2007/0153782 A1 | 7/2007 | Fletcher et al. | |
| 2008/0004058 A1 | 1/2008 | Jeong et al. | |
| 2008/0025210 A1* | 1/2008 | Honary | H04L 47/10 370/229 |
| 2009/0201813 A1 | 8/2009 | Speight | |
| 2009/0300208 A1 | 12/2009 | Lepeska | |
| 2010/0029275 A1 | 2/2010 | Bosch et al. | |
| 2010/0042730 A1 | 2/2010 | Kang | |
| 2010/0075626 A1 | 3/2010 | Titus et al. | |
| 2010/0110989 A1* | 5/2010 | Wu | H04L 47/10 370/328 |
| 2011/0170464 A1* | 7/2011 | Sengottaiyan | H04W 52/0229 370/311 |
| 2011/0201351 A1 | 8/2011 | Chen | |
| 2011/0252116 A1* | 10/2011 | Menoher | H04L 63/105 709/217 |
| 2012/0137019 A1 | 5/2012 | Kotecha et al. | |
| 2012/0155386 A1 | 6/2012 | Krishnaswamy et al. | |
| 2015/0074187 A1 | 3/2015 | Fletcher et al. | |
| 2015/0334088 A1 | 11/2015 | Luo et al. | |

FOREIGN PATENT DOCUMENTS

| | | |
|---|---|---|
| CN | 101729354 A | 6/2010 |
| EP | 0903906 A2 | 3/1999 |
| EP | 1914952 A1 | 4/2008 |
| WO | 2010109054 A1 | 9/2010 |
| WO | 2012064235 A1 | 5/2012 |

OTHER PUBLICATIONS

Möller, N. et al., "Using Radio Network Feedback to Improve TCP Performance over Cellular Networks", Conference publication, 44th IEEE Conference on Decision and Control, 2005 and 2005 European Control Conference. CDC-ECC '05, Seville, Spain, Dec. 12, 2005, pp. 7434-7439, IEEE.

Paper, W. "Beyond Caching: The User Experience Impact of Accelerating Dynamic Site Elements across the Internet", Nov. 1, 2008, pp. 1-11, Akamai Technologies, Inc.

Sevcik, P., et al, "Why SAP Performance Needs Help", Jul. 1, 2006, pp. 1-9, NetForecast Report 5084, NetForecast, Inc.

Jacobson, V., et al, "TCP Extensions for High Performance", Network Working Group Request for Comments: 1323, May 1, 1992, pp. 1-33, Obsoletes: RFC 1072, RFC 1185.

Serrano, C., et al, "Latency in Broad-band Mobile Networks", IEEE 69th Vehicular Technology Conference, Apr. 26, 2009, pp. 1-7, Barcelona, ES.

Metzler, J., "The 2009 Handbook of Application Delivery A Guide to Decision Making in Challenging Economic Times", Mar. 1, 2009, pp. 1-133, Webtorials.

* cited by examiner

METHOD FOR ENABLING TRAFFIC ACCELERATION IN A MOBILE TELECOMMUNICATION NETWORK

CROSS-REFERENCE TO RELATED APPLICATIONS

The present application is a continuation of U.S. application Ser. No. 13/991,950, which is the national stage entry under 35 U.S.C. 371 of international application no. PCT/SE2010/051345, filed Dec. 7, 2010, each of which applications are incorporated herein by reference in their entirety.

TECHNICAL FIELD

The present invention generally relates to systems and methods and, more particularly, to mechanism and techniques for enabling traffic acceleration in a mobile telecommunication network.

BACKGROUND

Companies are rapidly adding dynamic, rich and interactive capabilities to improve user experiences, grow online audiences, and drive page views and transactions. As Web sites evolve toward completely rich, dynamic online channel experiences, businesses face a new, but stark challenge: this dynamic content cannot be cached and takes longer to load in a Web page. Today's consumers and businesspeople have come to expect highly personal and interactive online experiences. Whether they are making a purchase, booking a reservation or watching a movie, they demand a smooth, flawless experience and they will not hesitate to click to another site when their expectations go unmet. Sluggish site performance and slower page downloads can diminish the user experience and increase site abandonment. The result is lower customer loyalty and revenue.

Content Distribution Network CDN providers Internet are currently offering traffic acceleration services to address the issue of Quality of Experience QoE for Internet based services from regular browsing to e-commerce. An example of an acceleration offering is the EdgePlatform [see: Beyond Caching; The User Experience Impact of Accelerating Dynamic Site Elements across the Internet, 2008]. The EdgePlatform provides the insight into Internet traffic patterns and is the dynamic site acceleration platform for three critical technologies used to carry site content requests from the customer's browser to the company's origin data center and back—in an instant.

The below mentioned three technologies compensate for the inadequacies of BGP, TCP and HTTP protocol and effectively create a new Internet platform for today's dynamic online businesses.

SureRoute for Performance
Transport Protocol Optimization
Prefetching

Traffic acceleration is based on a set of components. These include; Domain Name Server DNS system with global mapping function, a set of distributed acceleration servers and a Service level Agreement SLA between a Content Distribution Network CDN provider and portal provider (web application provider). The SLA also means a set of configurations on the portal provider's DNS server.

The following steps summarize the acceleration process:
1. CDN provider's dynamic mapping system directs user requests for application content to an optimal acceleration server.
2. Route optimization technology identifies the fastest and most reliable path back to the origin infrastructure to retrieve dynamic application content.
3. A high-performance transport protocol transparently optimizes communications between the acceleration server and the origin, improving performance and reliability.
4. The acceleration server retrieves the requested application content and returns it to the user over secure optimized connections.

The CDN providers understand that in a few years Internet will be mostly accessed via mobile broadband rather than via fixed broadband. For this reason they will like to be able to offer their services to their customers (content providers) in mobile networks, i.e. be able to perform acceleration of traffic for terminals connected to mobile networks.

Figure 1A:
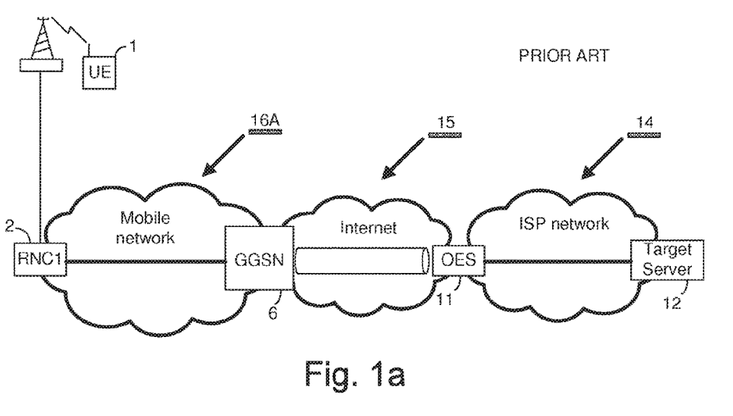
FIG. 1a is part of the prior art and discloses a block schematic illustration of an Internet Service Provider ISP network, an Internet network and an operator's mobile network whereby traffic is tunnelled through the Internet network.
Figure 1B:
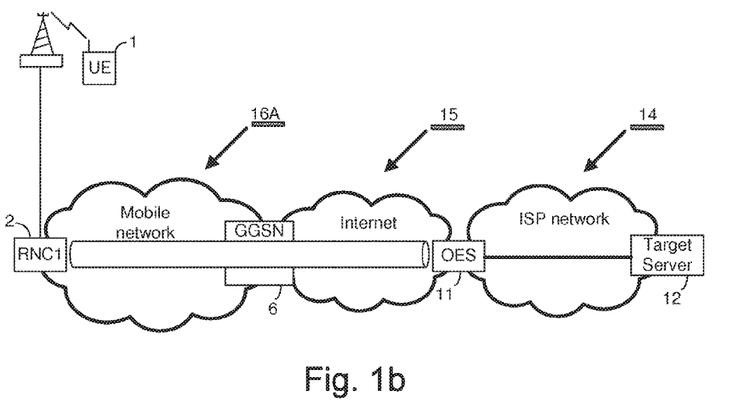
FIG. 1b discloses a block schematic illustration of an Internet Service Provider ISP network, an Internet network and an operator's mobile network whereby traffic is tunnelled through the Internet and mobile network.

FIGS. 1 (1a and 1b) discloses a system comprising an Internet Service Provider ISP network 14, an Internet network 15 and an operator's mobile network 16A. The system is an overlay mechanism that operates by receiving IP packets at one set of servers, tunneling these packets through a series of servers, and delivering them to a fixed, defined IP address. The ISP network 14 comprises a target server 12 that is an entity whose traffic is to be tunneled through the overlay mechanism. Edge servers are located in the ISP network and in the Internet network. An origin edge server 11 can be seen in FIG. 1 and is responsible for receiving, encapsulating and forwarding IP packets. The operator's mobile network 16A comprises a Gateway GPRS Support Node GGSN 6 and a Radio Network Controller RNC1 2. User equipment UE 1 is in radio connection via a base station with RNC1 2 in FIG. 1. Currently, the furthest deployment of traffic acceleration servers in the mobile networks that the CDN providers can offer is at the GGSN level. This is disclosed in FIG. 1a (the figure belongs to prior art) with an acceleration tunnel between the origin edge server 11 and the Gateway GPRS Support Node GGSN 6. However due to latencies existing below the GGSN [see: Latency in Broad-band Mobile Networks, C Serrano et al], the CDN providers will like to be able to go deeper into the mobile network. Deploying the accelerators at the RNC in 3G networks enables operators to be even closer to the end users, this way they can provide improved QoE to end users and thereby create a new offering to their customers the content providers. This is disclosed in FIG. 1b with an acceleration tunnel between the origin edge server 11 and the Radio Network Controller RNC1 2.

Latencies are mainly due to the characteristics of the access technologies in the different network segments. The values however will vary depending on the transmission technology (e.g. fiber, coaxial cable or microwave) and also on specific characteristics of a given operator's network. Quality of Experience QoE is a subjective measure of a customer's experiences with a technology or service. For Web browsing experience such as for example purchasing an airline ticket online, the measure of the responsiveness of the web portal application is of crucial importance for the success of the business transaction. In the worst case scenario, due the user's perception of the 'slowness' of using the web portal application, the end user can abandon the attempt to use the portal and this leads to a business loss for the portal owner.

A model is helpful to illustrate the potential performance bottlenecks in any application environment in general, as well as in a Web 2.0 environment in particular. A model discussed in [The 2009 Handbook of Application Delivery: A Guide to Decision Making in Challenging Economic Times, Dr. Jim Metzler] is a variation of the application response time model created by Sevcik and Wetzel [Why SAP Performance Needs Help, NetForecast Report 5084, http:/www.netforecast.com/ReportsFrameset.htm]. As shown below in an application Response Time Model, the application response time (R) is impacted by amount of data being transmitted (Payload), the WAN bandwidth, the network round trip time (RTT), the number of application turns (AppTurns), the number of simultaneous Transmission Control Protocol TCP sessions (concurrent requests), the server side delay (Cs) and the client side delay (Cc).

$$R \approx \frac{Payload}{Goodput} + \frac{(\#ofAppsTurns * RTT)}{Concurrent\ Requests} + Cs + Cc$$

Lab tests disclosed in [The 2009 Handbook of Application Delivery: A Guide to Decision Making in Challenging Economic Times, Dr. Jim Metzler] show the effect latency would have on an inquiry-response application. As network latency is increased up to 75 ms, it still has little impact on the application's response time, but if network latency goes above 150 ms., the response time of the application degrades rapidly and is quickly well above the target response time.

Transmission Control Protocol TCP is today designed for low latency and high bandwidth networks with few communication errors. However, the standard TCP settings are not optimal for mobile networks, as mobile networks are characterized by high latency, low or medium bandwidth and more communication errors than in fixed networks. Therefore, TCP also includes a number of wireless extensions that can be used to maximize the throughput in mobile networks.

Wireless TCP standard settings have been recommended by Open Mobile Alliance OMA. The minimum window size required to maximize TCP performance is computed by Bandwidth Delay Product (BDP), where Bandwidth is the available bandwidth and Delay is the round-trip time of the given path [RFC1323]. The maximum window size is the minimum of the send and receive socket buffer. The receive socket buffer generally determines the advertisement window on the receiver. The congestion window on the sender further limits the amount of data the sender can inject into the network depending on the congestion level on the path. If the maximum window size is too small, relative to the available bandwidth of the network path, the TCP connection will not be able to fully utilize the available capacity. If the maximum window is too large for the network path to handle, the congestion window will eventually grow to the point where TCP will overwhelm the network with too many segments, some of which will be discarded before reaching the destination.

According to [Using Radio Network Feedback to improve TCP Performance over Cellular Networks, N Möller et al] TCP proxy improves performance in mobile networks for person to person as well as person to content services. The performance improvements are based on the reduction of latency (RTT). Architecture has here been proposed whereby Radio Network Feedback (RNF) is signaled to a TCP proxy for the selection of best settings TCP settings for egress traffic. The RNF relies on the radio resource management (RRM) algorithms, located in a Radio Network Controller RNC, which make use of information such as uplink interference, total downlink power and orthogonal codes to determine network condition. The problem of the existing solutions is that the last segment of the network, i.e. between the Radio Network Controller RNC (base station in some scenarios) and the end user still has significant latency (RTT).

SUMMARY

An aim of the invention is to overcome above identified limitations of the prior art. A solution is hence needed to be able to further reduce the latency between a Radio Network Node (RNN) (e.g. a Radio Network Controller, base station or evolved Node B) and an end user. The invention focuses on the deployment of functionality inside the RNN that enables the reduction of latency in a network segment between the RNN and the end user.

The solution in one exemplified embodiment is a method for enabling traffic acceleration in a mobile telecommunication network. The method comprises the following steps:

A TCP session based on TCP parameters adapted for a radio link on which end user traffic is to be transported is determined in a Radio Network Node in the telecommunication network.

The TCP session is originated from the Radio Network Node. The session is used to transport the end user traffic.

The solution in another exemplified embodiment is a Radio Network Node RNN for enabling traffic acceleration in a mobile telecommunication network. The Radio Network Node comprises:

Means for determining a TCP session based on TCP parameters adapted for a radio link on which end user traffic is to be transported.

Means for originating the TCP session from the Radio Network Node, which TCP session is used to transport the end user traffic.

In yet another exemplified embodiment is described an article for manufacture comprising a program storage in a Radio Network Node having a computer code embodied therein for enabling traffic acceleration in a mobile telecommunication network. The code comprises:

computer readable program code for determining a TCP session based on TCP parameters adapted for a radio link on which end user (1) traffic is to be transported.

computer readable program code for originating the TCP session, which TCP session is used to transport the end user (1) traffic.

An object of the invention is to improve Quality of Experience to end users.

Some advantages of the invention are as follows:

The CDN providers are able to extend their business offering towards mobile networks and hence leads to new revenue streams.

The operator's and network equipment vendors could get a share of the new revenue from the CDN operators as they will have to take an active role in deploying and implementing the new acceleration functions.

With the increase of Quality of Experience, the operators will decrease the customer churn and hence improve their existing revenue streams.

The Network vendors will be able to sell more equipment as these will have new traffic acceleration features.

The solution enables the operators to completely 'hide' their network topology from 3rd parties (CDN providers).

The solution has minimum impact on current design and functionality of access and core nodes.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 2A:
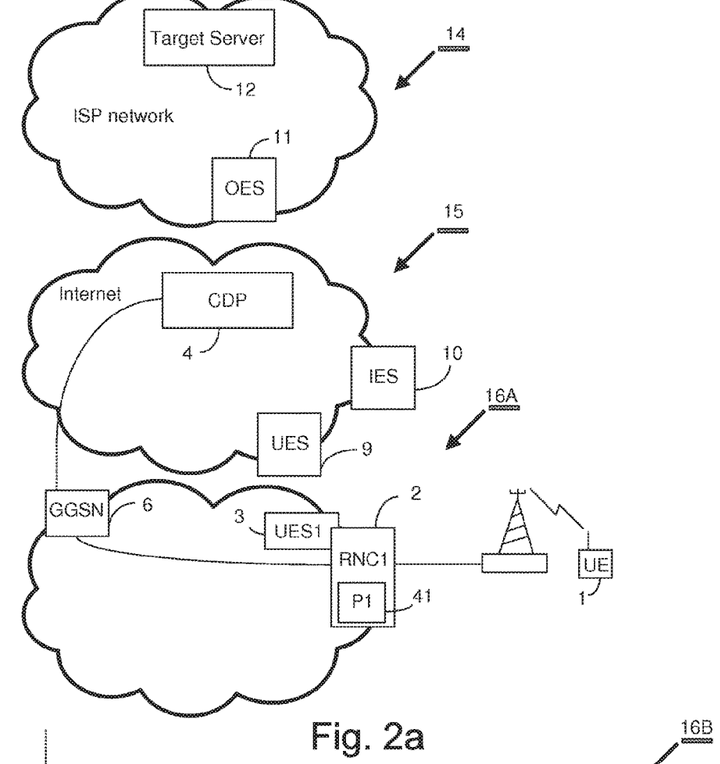
FIG. 2a discloses a block schematic illustration of an Internet Service Provider ISP network, an Internet network and an operator's mobile network of 3G type. A proxy server is located in a Radio Network Controller in the 3G network.

FIG. 2a discloses a system comprising an Internet Service Provider ISP network 14, an Internet network 15 and an operator's mobile network 16A. The system is an overlay mechanism that operates by receiving IP packets at one set of servers, tunneling these packets through a series of servers, and delivering them to a fixed, defined IP address. Edge servers 11, 9 can be seen in the ISP network and in the Internet network. The origin edge server 11 is responsible for receiving, encapsulating and forwarding IP packets. The User edge server 9 is responsible for receiving, encapsulating and/or decapsulating and forwarding IP packets. The ISP comprises a target server 12 that is an entity whose traffic is to be tunneled through the overlay mechanism. The Internet network comprises a Content Delivery Provider 4. The term "content delivery provider" refers to those services that at least distribute (provide) the existing content to the users (e.g. Akamai, YouTube). Thus, a content delivery provider may not generate the content (Akamai) or may generate the content (YouTube) in addition to delivering the content. The operator's mobile network is of 3G type in this example and comprises a Gateway GPRS Support Node GGSN 6 and a Radio Network Controller RNC1 2. An end user 1 is in FIG. 1 in radio connection with RNC1 2. A proxy 41 (e.g. a TCP proxy) is according to the invention located in the RNC1. The proxy optimizes traffic from its deployed location. The general idea is that the proxy through a set of mechanisms selects the best TCP settings for a TCP session used to transport end user traffic from the Radio Network Controller.

The proxy 41 will be further discussed and explained more in detail when the invention is explained later in this application.

Figure 2B:
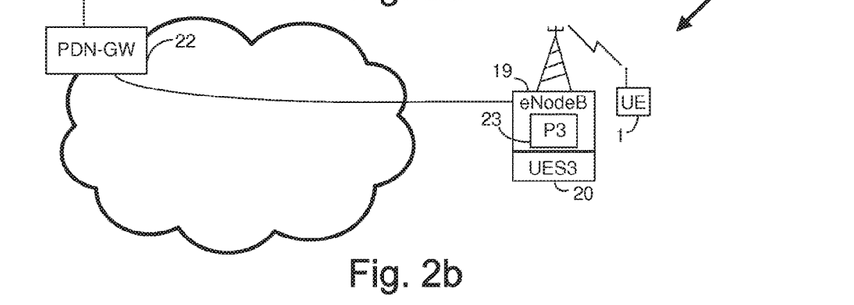
FIG. 2b discloses a block schematic illustration of an operator's mobile network of LTE type associated to the Internet Service Provider ISP network and Internet network in FIG. 2a. A proxy server is located in an evolved Node B in the LTE network.

FIG. 2b discloses parts of a Long-Term Evolution LTE system. The end user 1 is in radio connection with an evolved Node B eNodeB 19 that is attached to a PDN-Gateway 22 that is the access gateway towards the Internet network disclosed in FIG. 2a (indicated with a dotted line). The eNodeB provides the LTE air interface and performs radio resource management for the evolved access system. A user edge server UES3 20 is attached to the eNodeB. A proxy 23 (e.g. a TCP proxy) is according to the invention located in the eNodeB 19. The proxy 23 will be further discussed later in this application.

Figure 3:
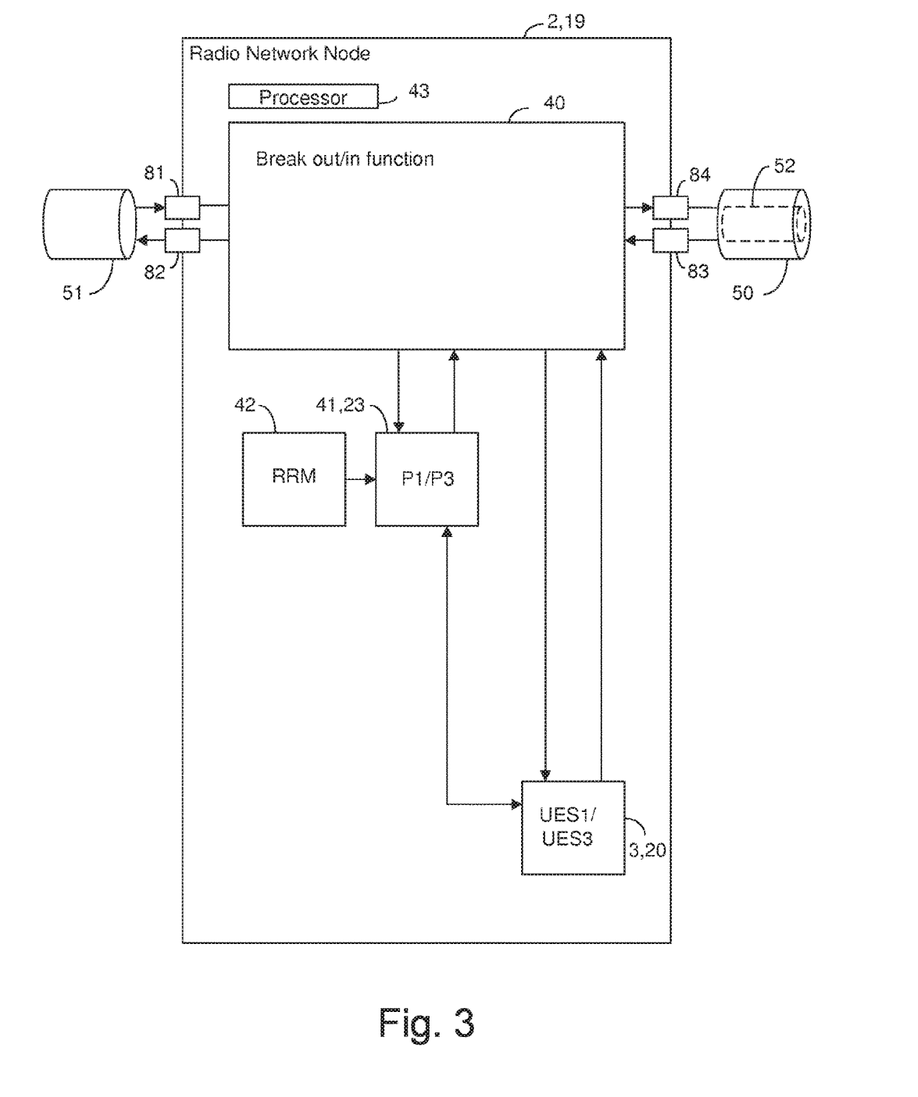
FIG. 3 discloses a block schematic illustration of a Radio Network Node.

FIG. 3 discloses a Radio Network Node RNN that for example can be a Radio Network Controller RNC1 2 as shown in FIG. 2a or an eNodeB 19 as shown in FIG. 2b. The RNN configuration comprises in this example a Break out/in function 40 that handles break out/in of traffic from 3GPP tunnels denoted 50 (radio access bearer based on radio traffic stack e.g. PDCP) and 51 (GPRS Tunnelling Protocol (GTP)). The break out/in function is attached via northbound downstream and upstream interfaces 83,84 and further attached via southbound downstream and upstream interfaces 81,82. An edge server 3,20 is a tunnel termination point for an acceleration tunnel 52 maintained by the Content Delivery Provider 4 in the internet network. The edge server is connected to a system of Internet edge servers and the process of setting this up can be done for example by replicating in the mobile network the technology well known from internet network. By using for example the technique described in the U.S. Pat. No. 7,660,296 the mapping mechanism described will enable the Content Delivery Provider to inform the end user of a suitable edge server to address when traffic packets are to be sent from the end user. As already mentioned, the RNN may be for example a Radio Network Controller RNC or an evolved Node B eNodeB. The User Edge Servers UES1 3 and UES3 20 shown in FIGS. 2a and 2b are shown in FIG. 3 within the RNN. The proxies P1 41 and P3 23 shown in FIGS. 2a and 2b are shown in FIG. 3 within the RNN. In case the RNN is an RNC, the User Edge Server is UES1 3 and the proxy is P1 41. In case the RNN is an eNodeB, the User Edge Server is UES3 20 and the proxy is P3 23. A Radio Resource Management module RRM 42 is attached to the proxy. The invention strives to achieve the best TCP parameter settings on the network segment between the proxy and the end user based on parameters received from Radio Resource Management module RRM 42. For traffic from the end user to the internet, the proxy is able to adjust the parameters as the traffic enters the edge server based on parameters provided by the server. The result of an optimal TCP parameter adjustment will result in lowering the latency RTT in the network segment below the RNN towards the end user and in it will result in optimized TCP traffic settings taking into account the characteristics of the link in the network segment above the RNN towards the ISP network. A processor 43 is used to control the entities within the RNN.

Figure 4:
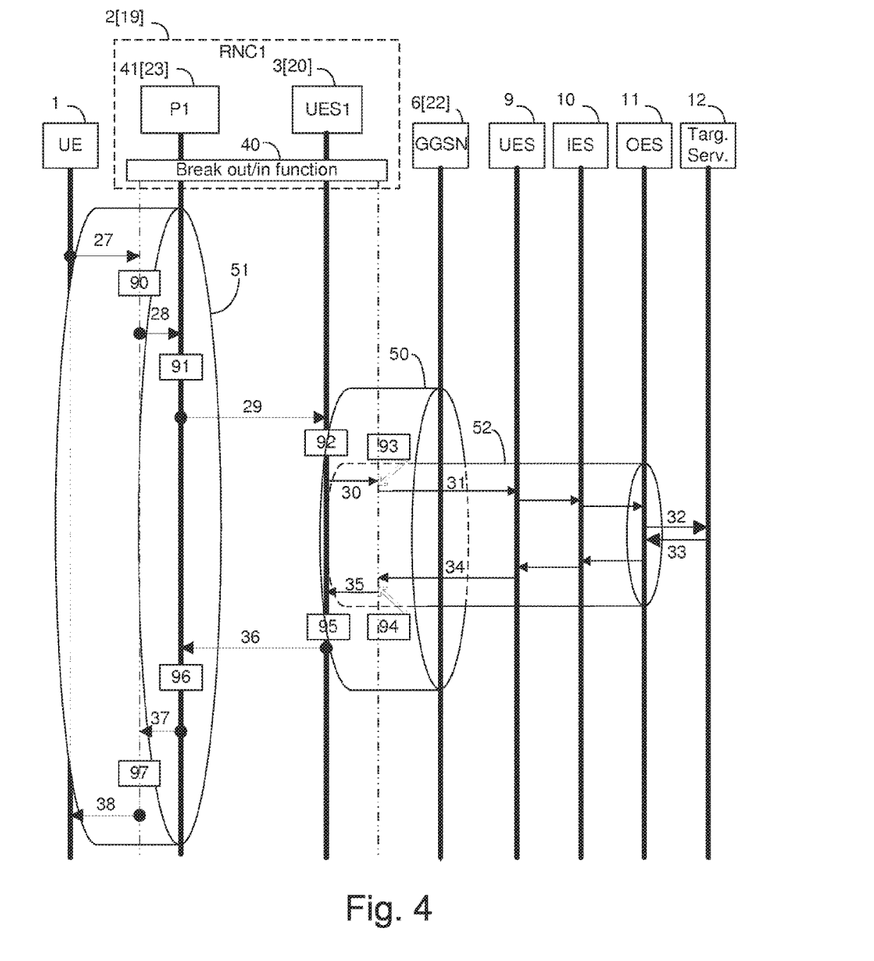
FIG. 4 discloses a signal sequence diagram of a method to transport IP packets from/to an end user via a Proxy in a Radio Network Controller (or eNodeB) to/from a target server.

FIG. 4 discloses a signal sequence diagram of a method for enabling traffic acceleration by adapting TCP sessions used to transport end user traffic. In the method that now will be explained the mobile network is a 3G network and the Radio Network Node RNN is a Radio Network Controller RNC as disclosed in for example FIG. 2a. Signalling points 1,2,3,40,41,6,9,10,11 and 12 shown in FIG. 4 have been explained earlier together with the FIGS. 1, 2a and 3. It is to be observed that reference signs within brackets aim to disclose the method in case an LTE network would have been used instead of the 3G network. The LTE entities eNodeB 19, UES3 20, PDN-GW 22, P3 23 referred to by reference signs within brackets have earlier been mentioned/ explained in for example FIG. 2b. A precondition for the method that now will be explained is that the selection of the User Edge Server 3 in the Radio Network Controller 2 to be used by the terminal has taken place, for example by using the technique briefly explained in FIG. 3. The method comprises the following steps:

The end user 1 sends 27 traffic IP packets to the Radio Network Controller 2.

The Break out/in function 40 inspects 90 the destination IP address of the packets and if they are destined towards the User Edge Server 3 they are channelled out of the 3GPP tunnel 51 (see also FIG. 3) towards 28 the proxy P1 41 (for example a TCP Proxy or an application proxy), else the packets are allowed to flow towards the GGSN.

Transmission Control Protocol TCP parameters are adapted 91 for a link between User Edge Server UES1 3 in the Radio Network Controller RNC1 2 and the User Edge Server 9 in the internet network. The parameters are adapted based on feedback from the User Edge Server in the RNC1. The feedback is based on the state of the link between the User Edge Server 3 and User Edge Server 9 using for example the technique described in the U.S. Pat. No. 7,660,296.

The IP packets are forwarded 29 to the User Edge Server 3 in RNC1.

The User Edge Server 3 performs an encapsulation 92 of IP packets in accordance to acceleration tunnel rules, e.g. as described in the U.S. Pat. No. 7,660,296. The packets are inserted into the CDN provider's acceleration tunnel 52.

The IP packets are forwarded 30 to the Break out/in function 40.

The Break out/in function inserts 93 the packets into the 3GPP tunnel 50.

Packets are forwarded 31 upstream inside the acceleration tunnel 52 and sent 32 to the Target Server 12. At the GGSN 6, the 3GPP tunnel 50 carrying the accelerated traffic is terminated in accordance to 3GPP.

The Target Server gets the packets. The Target Server composes a reply and sends 33 it back towards the end user 1. Upon getting to the GGSN 6, the accelerated traffic is encapsulated into the 3GPP tunnel 50 in accordance to 3GPP.

Traffic packets inside the acceleration tunnel 52 are forwarded 34 downstream inside the 3GPP tunnel 50 to the break out/in function 40 in the RNC1.

The traffic is broken out 94 of the tunnel 50. If the packets are destined for UES1, packets are forwarded to UES1, else the traffic is inserted into the downstream tunnel 51 and sent unmodified to the end user 1.

The IP packets are forwarded 35 from the Break out/in function 40 to the UES1 3.

The User Edge Server UES1 de-capsulates 95 the packets from the acceleration tunnel 52.

The packets are forwarded 36 to the TCP Proxy P1 41.

The TCP Proxy gets information about the current radio network conditions. Transmission Control Protocol TCP parameters are adapted 96 for a radio link between User Edge Server 3 in Radio Network Controller RNC1 2 and the end user 1. The parameters are adapted based on feedback from the Radio Resource Management module RRM 42 (see FIG. 3). The feedback includes available bandwidth and delay to calculate the appropriate window size to maximize TCP performance.

The packets are forwarded 37 internally in the RNC1 from the TCP Proxy P1 41 to the Break out/in function 40.

Packets are inserted in 97 into the tunnel 51.

The traffic IP packets are sent 38 to the end user 1.

In the document [Using Radio Network Feedback to improve TCP Performance over Cellular Networks, N Möller et al] that was mentioned in the background part of this patent application, the proxy is located outside the Radio Network Controller RNC and architecture is proposed so that Radio Network Feedback (RNF) is signaled to the TCP proxy for the selection of best TCP settings for egress traffic. The RNF hereby relies on the Radio Resource Management (RRM) algorithms, located in a Radio Network Controller RNC, which make use of information such as uplink interference, total downlink power and orthogonal codes to determine network condition. In the invention as claimed, instead the proxy is located in the Radio Network Controller. By locating the proxy in the RNC where the RRM is located, focus instead is kept strictly on the radio link. Improvement is hereby made both on the session between the location of the proxy (when located apart from the RNC) and the RNC, and on the session on the link between the RNC and the end user, i.e. by using the invention granularity has been refined.

Figure 5:
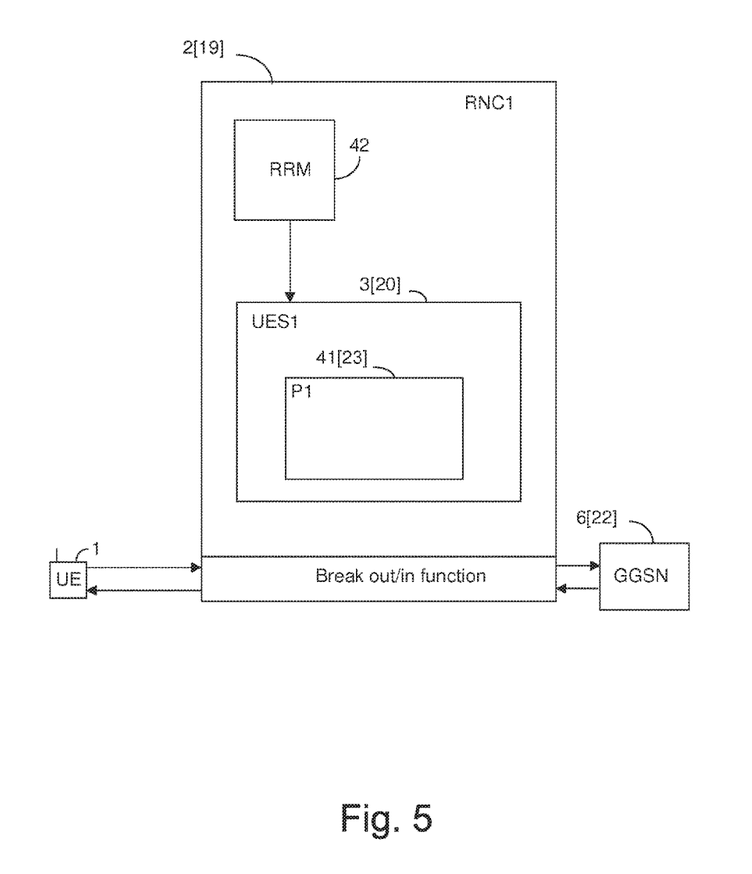
FIG. 5 discloses a block schematic illustration of an alternative Radio Network Controller (or eNodeB).

As mentioned, the invention strives to achieve the best TCP parameter settings on the network segment between the TCP proxy and the end user. To achieve this, the RNN architecture described so far has been applied. FIG. 5 discloses an alternative architecture where the proxy 41 instead is located within the User Edge Server 3. FIG. 5 discloses the Radio Network Controller RNC1 2 comprising the earlier described entities Radio Resource Management module RRM 42, User Edge Server UES1 3 and the Proxy P1 41. The end user 1 and the GGSN 6 are attached to the RNC1. The proxy P1 is in this alternative example incorporated in the UES1. In this case there is a direct feedback of the RRM into the UES1. It is to be observed that reference signs within brackets aim to disclose the architecture in case an LTE network would have been used instead of the 3G network. The LTE entities eNodeB 19, UES3 20, PDN-GW 22, P3 23 referred to by reference signs within brackets have earlier been mentioned/explained in for example FIG. 2b.

System and nodes that can be used to put the invention into practice is schematically shown in the figures. Enumerated items are shown in the figures as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI), Long Term Evolution (LTE) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method for enabling traffic acceleration in a mobile telecommunication network, the method comprising:
   determining, by a proxy in a radio network node in the mobile telecommunication network, a TCP session based on TCP parameter settings adapted for a radio link on which end user traffic is to be transported, which TCP parameter settings for traffic sent on the radio link to the end user are based on feedback to the proxy from a radio resource management function in the radio network node; and
   originating the TCP session from the radio network node, which TCP session is used to transport the end user traffic; and
   wherein the traffic is received by the radio network node from a server outside the mobile telecommunication network via an edge server in the radio network node.

2. The method for enabling traffic acceleration according to claim 1, wherein further TCP parameter settings for end user traffic sent through an upstream acceleration tunnel to a server outside the mobile network are based on feedback to the proxy from the edge server in the radio network node.

3. The method for enabling traffic acceleration according to claim 1, wherein the proxy is incorporated in the edge server.

4. The method for enabling traffic acceleration according to claim 1, wherein an IP address of the edge server in the radio network node has been received by the end user from a content provider located external the mobile network.

5. The method for enabling traffic acceleration according to claim 1, wherein the radio network node is a radio network controller in a 3G network.

6. The method for enabling traffic acceleration according to claim 1, wherein the radio network node is an evolved Node B in an Long-Term Evolution (LTE) network.

7. The method of claim 1, wherein the radio network node is an access node between the end user and a core network.

8. A radio network node of a mobile telecommunication network, the radio network node comprising:
   a processor;
   a memory, the memory containing instructions executable by the processor whereby the radio network node is configured to:
      determine, by a proxy in the radio network node, a TCP session based on TCP parameter settings adapted for a radio link on which end user traffic is to be transported, which TCP parameter settings for traffic sent on the radio link to the end user are based on feedback to the proxy from a radio resource management function in the radio network node; and
      originate the TCP session from the radio network node, which TCP session is used to transport the end user traffic; and
   a user edge server configured to send feedback to the proxy, which feedback is based on state of a link towards a server outside the mobile telecommunication network.

9. The radio network node of claim 8, wherein the memory contains instructions executable by the processor whereby the radio network node is configured to send feedback to the proxy, which feedback is based on state of the radio link towards the end user, from the radio resource management function in the radio network node.

10. The radio network node according to claim 8, wherein the radio network node is a radio network controller in a 3G network.

11. The radio network node according to claim 8, wherein the radio network node is an evolved Node B in an Long-Term Evolution (LTE) network.

12. The radio network node according to claim 8, wherein the radio network node is an access node between the end user and a core network.

13. A computer program product stored in a non-transitory computer readable medium for controlling a radio network node to enable traffic acceleration in a mobile telecommunication network, the computer program product comprising software instructions which, when run, cause the radio network node to:
   determine, by a proxy in the radio network node, a TCP session based on TCP parameters adapted for a radio link on which end user traffic is to be transported; and
   originate the TCP session which is used to transport the end user traffic,
   wherein the TCP parameters comprise settings for traffic sent on the radio link to the end user based on feedback to the proxy in the radio network node from a radio resource management function in the radio network node; and
   wherein the traffic is received by the radio network node from a server outside the mobile telecommunication network via an edge server in the radio network node.

14. The method of claim 1, wherein the radio resource management function provides feedback on the radio link using information indicative of a network condition.

15. The method of claim 14, wherein the information is one or more of:
   an uplink interference,
   total downlink power; and
   orthogonal codes.

16. The method of claim 1, wherein the TCP session is used to transport the end user traffic to a user equipment that is different than the radio network node.

* * * * *